US012266872B2

(12) United States Patent
Fernandez Duran et al.

(10) Patent No.: US 12,266,872 B2
(45) Date of Patent: Apr. 1, 2025

(54) COMPACT MULTI-BAND ANTENNA

(71) Applicant: NOKIA TECHNOLOGIES OY, Espoo (FI)

(72) Inventors: Alfonso Fernandez Duran, Madrid (ES); Eva Rajo Iglesias, Madrid (ES); Tomas Sanjuan Flores, Madrid (ES); Matilde Pilar Sánchez Fernández, Madrid (ES)

(73) Assignee: NOKIA TECHNOLOGIES OY, Espoo (FI)

( * ) Notice: Subject to any disclaimer, the term of this patent is extended or adjusted under 35 U.S.C. 154(b) by 98 days.

(21) Appl. No.: 18/148,224

(22) Filed: Dec. 29, 2022

(65) Prior Publication Data

US 2023/0223699 A1 Jul. 13, 2023

(30) Foreign Application Priority Data

Dec. 30, 2021 (EP) .................................... 21383242

(51) Int. Cl.
*H01Q 9/26* (2006.01)
*H01Q 1/24* (2006.01)
*H01Q 1/48* (2006.01)
*H01Q 5/307* (2015.01)

(52) U.S. Cl.
CPC ............... *H01Q 9/26* (2013.01); *H01Q 1/243* (2013.01); *H01Q 1/48* (2013.01); *H01Q 5/307* (2015.01)

(58) Field of Classification Search
CPC .......... H01Q 9/26; H01Q 5/307; H01Q 1/243; H01Q 1/48
See application file for complete search history.

(56) References Cited

U.S. PATENT DOCUMENTS 11,069,988 B1 7/2021 Huang et al.

FOREIGN PATENT DOCUMENTS

| | | |
|---|---|---|
| CN | 107681262 A | 2/2018 |
| CN | 110571523 A | 12/2019 |
| CN | 111883915 A | 11/2020 |
| CN | 112072313 A | 12/2020 |

OTHER PUBLICATIONS

Extended European Search Report for European Application No. 21383242.1 dated Jun. 20, 2022, 18 pages.
Ge et al., "A Low-Profile Magneto-Electric Dipole Antenna," IEEE Transactions on Antennas and Propagation, vol. 60, No. 4, (Apr. 2012), 6 pages.

(Continued)

*Primary Examiner* — Graham P Smith
(74) *Attorney, Agent, or Firm* — ALSTON & BIRD LLP

(57) ABSTRACT

An antenna is provided for operation across multiple frequency bands. The antenna includes, in order, a ground plane and a first conductive member separated from the ground plane. The antenna also includes a pair of second conductive members forming, with the first conductive member, a resonant structure sized to resonate at a higher frequency band of the multiple frequency bands. The antenna further includes a pair of third conductive members forming a resonant structure sized to resonate at a higher frequency band of the multiple frequency bands. The first conductive member is sized to resonate at a lower frequency band of the multiple frequency bands.

20 Claims, 3 Drawing Sheets

(56) References Cited

OTHER PUBLICATIONS

Ge et al., "A Wideband Magneto-Electric Dipole Antenna", IEEE Transactions on Antennas and Propagation, vol. 60, No. 11, (Nov. 2012), 5 pages.
Guo et al, "Wide-Bandwidth, High-Gain, Low-Temperature Cofired Ceramic Magneto-Electric Dipole Antenna and Arrays for Millimeter Wave Radio-Over-Fiber Systems", Photonics Research, vol. 2, No. 4, (Jul. 14, 2014), 5 pages.
Khorasani et al, "Dual-Band Magneto-Electric Dipole Antenna with High-Gain for Base-Station Applications", International Journal of Electronics and Communications, vol. 134, (Mar. 5, 2021), 8 pages.
Li et al., "A Wideband Dual-Band Magnetoelectric Dipole Antenna With Modified Feed Structure", 2018 International Conference on Microwave and Millimeter Wave Technology (ICMMT), (Dec. 6, 2018), 3 pages.
Li et al., "Wideband Magneto-Electric Dipole Antennas", In: Chen Z. (eds) Handbook of Antenna Technologies, (Jan. 1, 2015), 51 pages.
Luk et al., "A New Wideband Unidirectional Antenna Element", International Journal of Microwave and Optical Technology, vol. 1, No. 1, (Jun. 2006), 10 pages.
Wu et al,. "A Magneto-Electric Dipole With a Modified Ground Plane", IEEE Antennas and Wireless Propagation Letters, vol. 8, (2009), 3 pages.
Yang et al., "Dual-Band Dual-Polarized Magneto-Electric Dipole Antenna with Dual-Layer Structure", Progress in Electromagnetics Research M, vol. 92, (Feb. 2020), 10 pages.

COMPACT MULTI-BAND ANTENNA

CROSS-REFERENCE TO RELATED APPLICATIONS

This application claims priority to European Patent Application No. 21383242.1, filed Dec. 30, 2021, the entire contents of which are incorporated herein by reference.

TECHNOLOGICAL FIELD

Embodiments of the present disclosure relate to a compact multi-band antenna.

BACKGROUND

It is desirable to have an antenna that operates across multiple frequency bands. It is also desirable for antennas to occupy a reasonable amount of space.

An antenna can be formed from a resonant structure. The resonant structure has an electrical length that can create standing waves of a range of target frequencies. The smallest resonant structures have an electrical length of a quarter wavelength of the resonant frequency.

In order to have an antenna that operates across multiple bands it is necessary to use a single resonant structure with a large bandwidth (small Q-factor) or use multiple resonant structures which operate across one or more of the multiple bands.

The broadening of the bandwidth and or the addition of multiple resonant structures can occupy space.

It is therefore desirable to have a compact antenna that operates across multiple frequency bands.

BRIEF SUMMARY

According to various, but not necessarily all, embodiments there is provided an antenna for operation across multiple frequency bands, the antenna comprising, in order,

- a ground plane;
- a first conductive member separated from the ground plane;
- a pair of second conductive members forming, with the first conductive member, a resonant structure sized to resonate at a higher frequency band of the multiple frequency bands;
- a pair of third conductive members forming a resonant structure sized to resonate at a higher frequency band of the multiple frequency bands;
- wherein the first conductive member is sized to resonate at a lower frequency band of the multiple frequency bands.

In some but not necessarily all examples, the higher frequency band associated with the pair of third conductive members and the higher frequency band associated with the pair of second conductive members are the same or overlap.

In some but not necessarily all examples, the ground plane is galvanically isolated from the first conductive member, the pair of second conductive members and the pair of third conductive members. For example, in some examples, the ground plane is galvanically isolated from the first conductive member, but not necessarily from the pair of second conductive members.

In some but not necessarily all examples, the first conductive member has a maximum electrical length that is a half of a resonant wavelength of the lower frequency band of the multiple frequency bands.

In some but not necessarily all examples, the pair of second conductive members form, with the first conductive member, a magnetic dipole.

In some but not necessarily all examples, the pair of third conductive members form a half wavelength electric dipole.

The magnetic dipole resonates at a higher frequency band of the multiple frequency bands and the electric dipole resonates at a higher frequency band of the multiple frequency bands. In some but not necessarily all examples, the higher frequency resonance/band of the electric dipole and the higher frequency resonance/band of the magnetic dipole can be the same or can overlap.

In some but not necessarily all examples, each of the second conductive members, extends from a first end adjacent the first conductive member to a second end adjacent a respective third conductive member, with an electrical length of a quarter of a resonant wavelength of the higher frequency band of the multiple frequency bands.

In some but not necessarily all examples, the pair of second conductive members are parallel with a void between them.

In some but not necessarily all examples, each of the third conductive members, extends from a first end adjacent a respective second conductive member to a distal end, wherein an electrical length between the respective distal ends of the third conductive members is a half of a resonant wavelength of the higher frequency band of the multiple frequency bands.

In some but not necessarily all examples, the pair of third conductive members lie in a common plane, and extend in opposite directions.

In some but not necessarily all examples, the pair of third conductive members are symmetrically arranged with respect to the second conductive members.

In some but not necessarily all examples, one of the pair of second conductive members is galvanically interconnected at a proximal end to the first conductive element and at a distal end to a proximal end of one of the pair of third conductive members, and the other one of the pair of second conductive members is galvanically interconnected at a proximal end to the first conductive element and at a distal end to a proximal end of the other one of the pair of third conductive members.

In some but not necessarily all examples, the first conductive member is planar and the pair of third conductive members are planar and parallel to the first conductive member and the first conductive member is planar and the pair of second conductive members are planar and perpendicular to the first conductive member.

In some but not necessarily all examples, the antenna comprises a feed common to the multiple frequency bands. In some but not necessarily all examples, the antenna feed is galvanically isolated from the first conductive member, the pair of second conductive members and the pair of third conductive members.

In some but not necessarily all examples, an electronic device comprises the antenna.

In some but not necessarily all examples, the first conductive member of the antenna is sized to resonate at the 2.4 GHz frequency band.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 5:
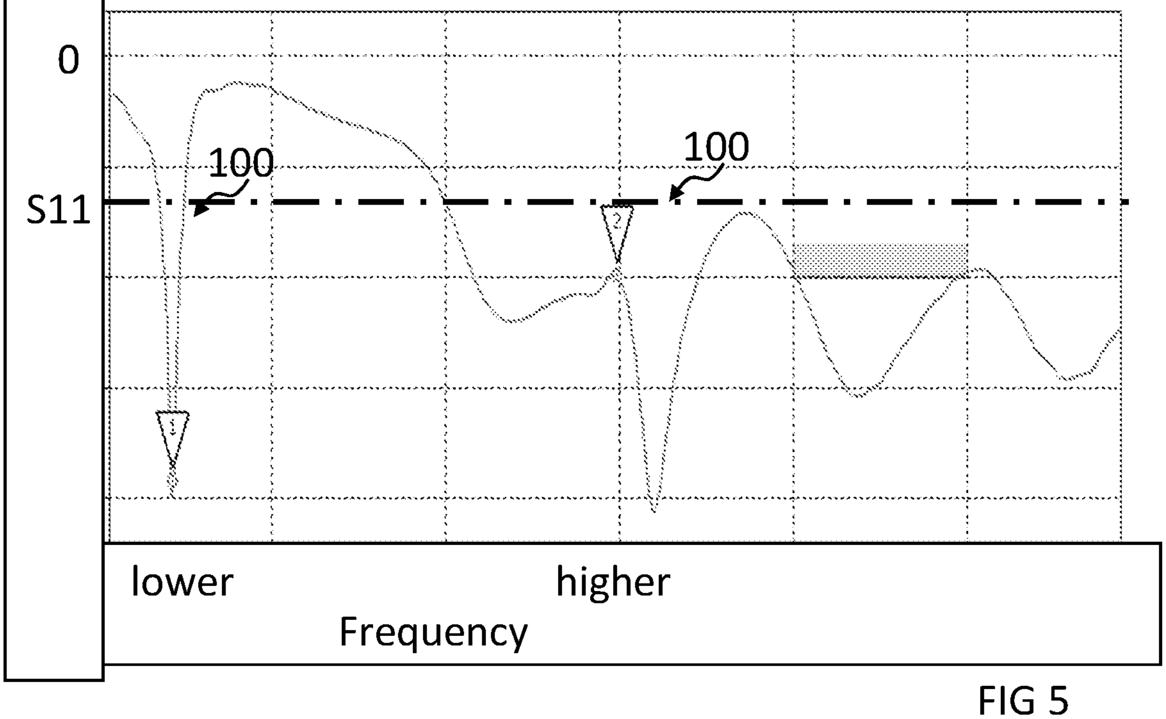
FIG. 5 shows an example of operational characteristics of the antenna.

The figures illustrate an example of an antenna 50 for operation across multiple frequency bands 100 (for example as illustrated in FIG. 5).

The antenna 50 comprises, in order, a ground plane 40;

a first conductive member 10 separated from the ground plane 40;

a pair of second conductive members 22 forming, with the first conductive member 10, a resonant structure 20 sized to resonate at a higher frequency band of the multiple frequency bands;

a pair of third conductive members 32 forming a resonant structure 30 sized to resonate at a higher frequency band of the multiple frequency bands;

wherein the first conductive member 10 is sized to resonate at a lower frequency band of the multiple frequency bands.

A common Cartesian co-ordinate system is defined for the examples of the antenna 50 illustrated. The co-ordinate system has mutually orthogonal x, y, z directions. A physical length (L) is defined in the x-direction, a height (H) is defined in the y-direction, and a width (W) is defined in the z-direction. It should be noted that an electrical length is different to a physical length and is defined in phase-space rather than physical space, it can be in any direction in physical space.

The order of the ground plane 40, first conductive member 10, a pair of second conductive members 22 and pair of third conductive members 32 is heightwise in the y-direction. The antenna 50 has a reduced size in this direction.

The term 'member' is used to refer to an item or thing without any implication as to its properties other than as described. It is synonymous with a 'part' or 'portion'.

The term 'conductive' is used to refer to electrical conductivity, that is, capable of transferring a direct electrical current.

The term 'electrical length' is a technical term used to refer to a dimension of an electrical conductor in terms of a phase shift introduced by transmission over that conductor at the frequency of interest. The phase shift is expressed in terms of wavelengths of the frequency of interest.

The term resonant wavelength will be used to refer to a wavelength that corresponds to a resonant frequency. A short resonant structure that resonates at a resonant frequency can therefore have an electrical length of one quarter the resonant wavelength or one half the resonant wavelength depending on boundary conditions.

In the examples illustrated, the first conductive member 10 is separated from the ground plane 40 and electrically isolated from the ground plane 40. In the examples illustrated, the ground plane 40 is galvanically isolated from the first conductive member 10, the pair of second conductive members 22 and the pair of third conductive members 32. However, in other examples, the ground plane 40 is galvanically isolated from the first conductive member 10, but not necessarily from the pair of second conductive members 22.

In the examples illustrated, the first conductive member 10 has a maximum electrical length that is a half of a resonant wavelength of the lower frequency band of the multiple frequency bands.

For example, the size of the first conductive member 10 can be about ½ of the middle wavelength of the lower frequency band. Where a dielectric 90 is used in the void 82 between the ground plane 40 and the first conductive member 10, the electrical length of the first conductive member 10 is approximately ½ of the middle wavelength of the lower frequency band as measured in the dielectric i.e. $\lambda/2*1/\sqrt{\varepsilon_r}$ where $\varepsilon_r$ is the relative dielectric constant of the dielectric material 90.

The first conductive member 10 does not need to have a specific shape. The size of the first conductor 10 (not the ground plane 40) is approximately $\lambda/2$ in the dielectric material 90.

The first conductive member 10 can, for example, be rectangular as illustrated, but can also be other shapes. The first conductive member 10 can, for example, be planar (flat) as illustrated but can also be non-planar. The first conductive member 10 can, for example, be a substantially continuous conductor but can also comprise slots or associated capacitively coupled elements. The form, shape and configuration of the first conductive member 10 can be varied in a manner similar to a patch antenna element.

In the examples illustrated, the pair of second conductive members 22 form, with the first conductive member 10 a magnetic dipole. The resonant structure 20 is a magnetic dipole. The term 'magnetic dipole' refers to a shorted quarter wavelength resonator which in these examples is a shorted quarter wavelength resonant cavity.

The resonant cavity is formed in the void 80 between the pair of second conductive members 22 and the portion of the first conductive member 10 between the pair of second conductive members 22. The open circuit end of the resonant cavity is distal from the first conductive member 10 and the closed-circuit end of the resonant cavity is at the first conductive member 10. The electrical length of the resonant cavity, in the y-direction, in the dielectric that fills the void 80, is one quarter of a resonant wavelength.

It will therefore be appreciated that the term "shorted" relates only to wave short circuit but does not necessary imply galvanic connection.

Thus, a height from the first conductive member 10 to a distal end of the second conductive members 22 is quarter wavelength long so that an open-circuit end of the cavity is provided at the distal ends of the second conductive members 22 since the cavity is ¼ wavelength from the short circuit condition provided at the first conductive member 10. Each of the second conductive members 22, extends from a first end adjacent the first conductive member 10 to a second end adjacent a respective third conductive member 32, with an electrical length of a quarter of a resonant wavelength of the higher frequency band of the multiple frequency bands.

Figure 1:
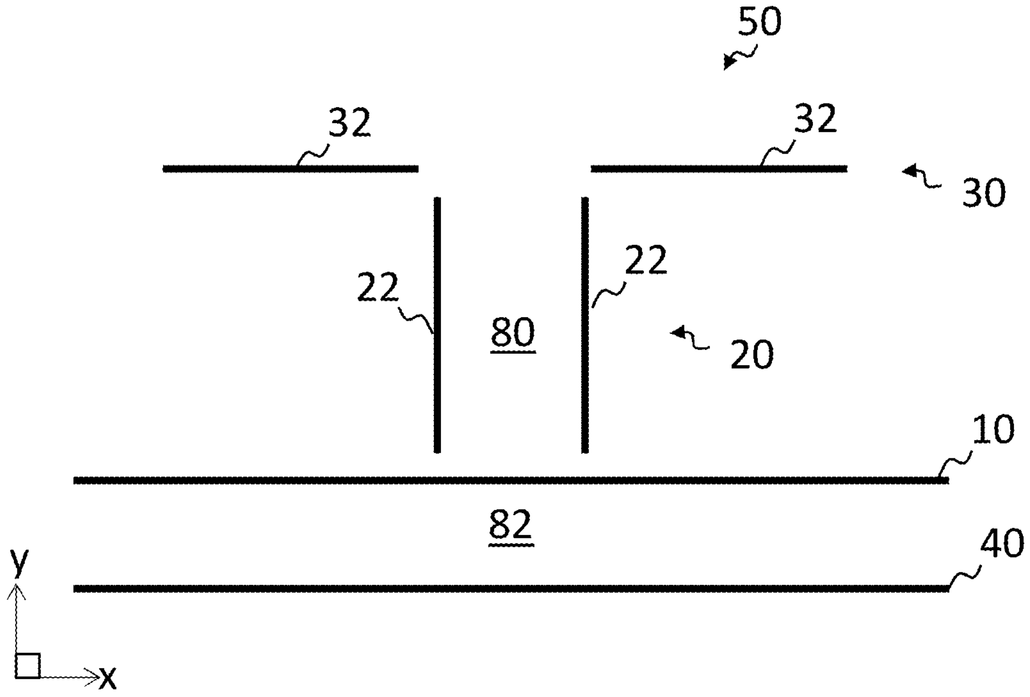
FIG. 1 shows an example of an antenna described herein.
Figure 2:
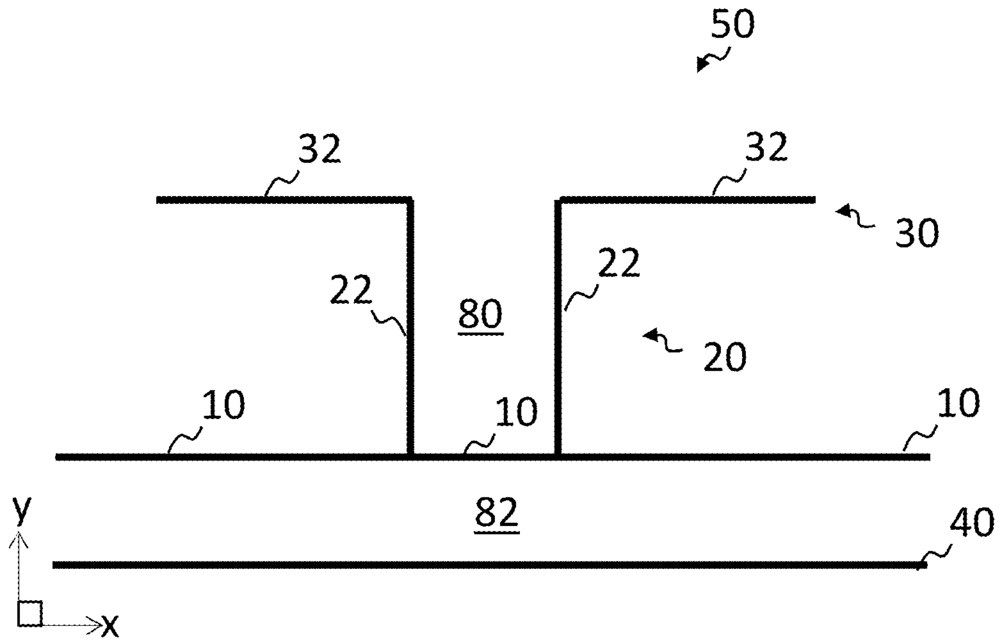
FIG. 2 shows another example of an antenna described herein.

The second conductive members 22 can be separate from the third conductive members 32 (FIG. 1) or can be galvanically interconnected (FIG. 2).

The second conductive members 22 can be separate from the first conductive member 10 (FIG. 1) or can be galvanically interconnected to the first conductive member 10 (FIG. 2). In the example illustrated in FIG. 2, the pair of second conductive members 22 are galvanically interconnected via the first conductive member 10.

The second conductive members 22 can, for example, be planar (flat) as illustrated but they can also be non-planar. The second conductive members 22 can, for example, be parallel with the void 80 between them.

In the examples, the pair of third conductive members 32 form, in combination, a half wavelength electric dipole. The resonant structure 30 is an electric dipole.

Each of the third conductive members 32, extends from a first end adjacent a respective second conductive member 22 to a distal end. An electrical length between the respective distal ends of the third conductive members 32 is a half of a resonant wavelength of a higher frequency band of the multiple frequency bands. In circuit theory, the distal end is electrically open circuit.

Figure 3A:
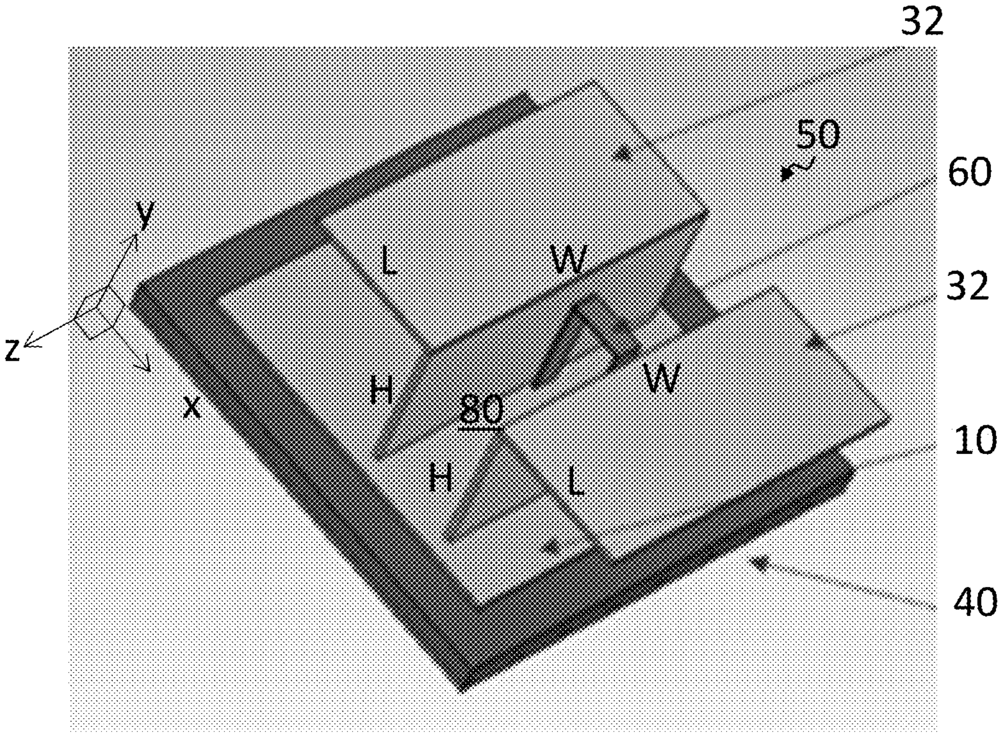
FIG. 3A and FIG. 3B show another example of an antenna described herein.
Figure 3B:
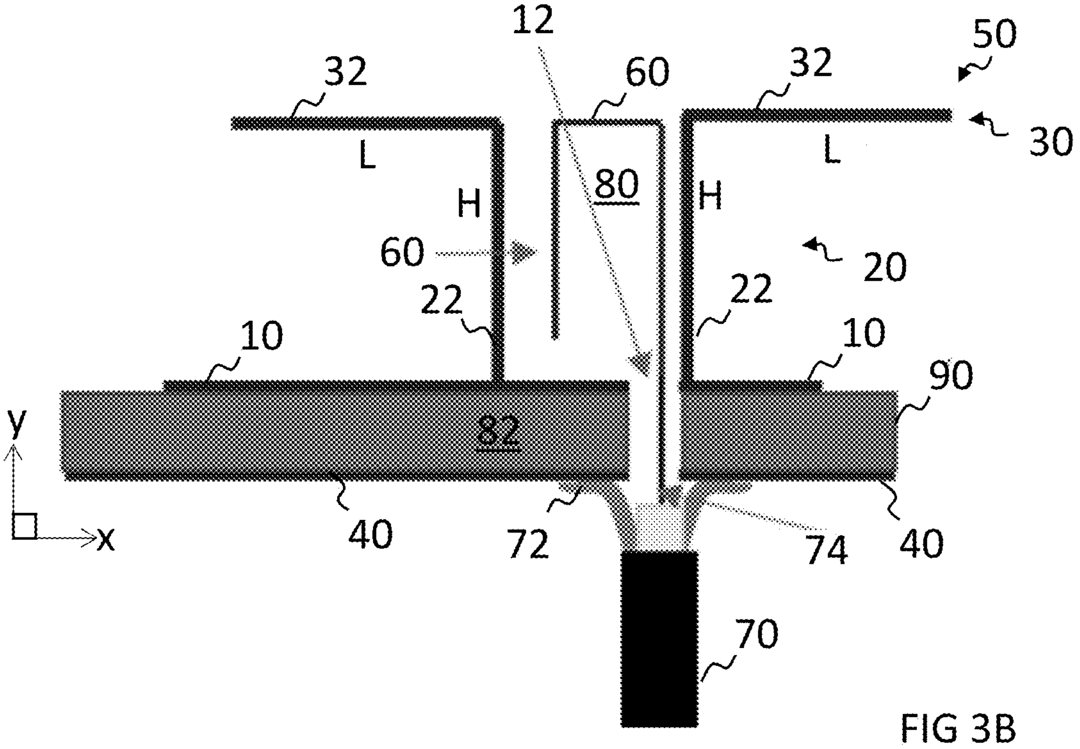

As shown in FIGS. 3A & 3B, an 'end' can be an endpoint in a two-dimensional cross-section FIG (FIG. 3B) and can be an edge in three-dimensions (FIG. 3A). In FIG. 3A, 3B the edge is a longer edge of a rectangular conductor.

The third conductive members 32 can, for example, be planar (flat) as illustrated but they can also be non-planar.

The third conductive members 32 can, for example, lie in a common plane, and extend in opposite directions.

The third conductive members 32 can, for example, be symmetrically arranged with respect to the second conductive members 22.

In the examples illustrated, the pair of second conductive members 22 are arranged with reflection symmetry in a first virtual plane (not illustrated but midway between the pair of second conductive members) and the pair of third conductive members 32 are arranged with reflection symmetry in the same first virtual plane.

In some examples, the first conductive member 10 is planar and the pair of third conductive members 32 are planar and parallel to the first conductive member 10. In the same or different examples, the first conductive member is planar 10 and the pair of second conductive members 22 are planar and perpendicular to the first conductive member 10.

In the examples illustrated, the first conductive member 10 is planar, the pair of second conductive members 22 are planar, mutually parallel, and also orthogonal to the first conductive member 10. The pair of third conductive members 32 are planar, mutually parallel, and also orthogonal to the second conductive members 22 (parallel to the first conductive member 10). Also, the ground plane 40 is planar and parallel to the planar first conductive member 10.

One or more of any of the conductive members 10, 22, 32 could be partially planar and partially non-planar. In the example where say only an end of a specific conductive member 10, 22, 32 needs to bend or be conformal with another component in an electronic device (e.g. a cover/housing, battery, display, etc). Other examples could include portions of a conductive member having corrugations or zigzag forms, and not limited to such examples.

A first L-shape is formed by the first one of the pair of second conductive members 22 and a first one of the pair of third conductive members 32. A second L-shape is also formed by a second one of the pair of second conductive members 22 and a second one of the pair of third conductive members 32. The first and second L-shapes have reflection symmetry in the virtual plane.

In some examples, the pair of second conductive members 22 are not parallel but still have reflection symmetry in the virtual plane. They can for example be fluted and either converge or diverge as they extend away from the first conductive member 10 towards the third conductive members 32.

In some examples, the pair of third conductive members 32 are not in a common plane but still have reflection symmetry in the virtual plane. They can for example be tilted in opposite directions i.e. both upwards or both downwards when extending outwards from the second conductive members 22.

In the examples illustrated in FIGS. 2 and 3A & 3B, one of the pair of second conductive members 22 is galvanically interconnected at its proximal end to the first conductive element 10 and at its distal end to a proximal end of one of the pair of third conductive members 32, and the other one of the pair of second conductive members 22 is galvanically interconnected at its proximal end to the first conductive element 10 and at its distal end to a proximal end of the other one of the pair of third conductive members 32.

A first L-shape conductor is formed by the first one of the pair of second conductive members 22 and the first one of the pair of third conductive members 32. A second L-shape conductor is formed by the second one of the pair of second conductive members 22 and the second one of the pair of third conductive members 32. The first and second L-shape conductors have reflection symmetry in the virtual plane.

A dielectric material 90 can be placed in the void 80 between the second conductive members 22.

A same or different dielectric material 90 can be placed in the void 82 between the ground plane 40 and the first conductive member 10. The height dimension (measured in the y-direction) of the dielectric 90, placed in the void 82, defines the bandwidth of the low frequency band and the antenna efficiency in that band. In some examples, it can be about 4 mm.

FIG. 3A is a perspective view of an example of an antenna 50 and FIG. 3B is a cross-sectional view of that antenna in the x-y plane, through the feed 60.

It will be appreciated from FIG. 3A that each of the second conductive members 22 has a width W (in z-direction) greater than its height H (in y-direction). In the particular example illustrated, the second conductive members 22 are planar rectangles that are parallel to the y-z plane, and the rectangles have a width W that is twice as great as the height H. The ratio of width to height can be used to control a radiation pattern and can be different than 2:1.

It will be appreciated from FIG. 3A that each of the third conductive members 32 has a width W (in z-direction) greater than its physical length L (in x-direction). In the particular example illustrated, the third conductive members 32 are planar rectangles that are parallel to the x-z plane, and the rectangles have a width W that is twice as great as the physical length L. The ratio of width to height can be used to control a radiation pattern and can be different than 2:1.

Although the second conductive members 22 and the third conductive members 32 are rectangular this is not essential and other shapes can be used.

In at least some examples, the pair of second conductive members 22 and the pair of third conductive members 32 have the same width W.

In at least some examples, the pair of second conductive members 22 have three-dimensional reflection symmetry in the virtual plane (the shape of each second conductive member 22 mirrors the shape of the other second conductive member 22) and the pair of third conductive members 32 have three-dimensional reflective symmetry in the virtual plane (the shape of each third conductive member 32 mirrors the shape of the other third conductive member 32).

FIGS. 3A & 3B illustrates an example of a feed 60 for the antenna. A feed 60 can also be present in the examples illustrated in FIGS. 1 and 2.

The feed 60 can be any suitable feed. It can be a galvanic feed or an electromagnetic feed.

The feed 60 can be a feed that is common to the multiple frequency bands.

In at least some examples, the feed 60 is galvanically isolated from the first conductive member 10, the pair of second conductive members 22 and the pair of third conductive members 32.

Referring to the example illustrated in FIGS. 3A & 3B, the feed 60 is an electromagnetic coupled feed. It is a monopole feed. It is positioned in the void 80 between the pair of second conductive elements 22.

In this particular example the feed 60 is an asymmetric feed and it does not have reflection symmetry in the virtual plane.

Figure 4:
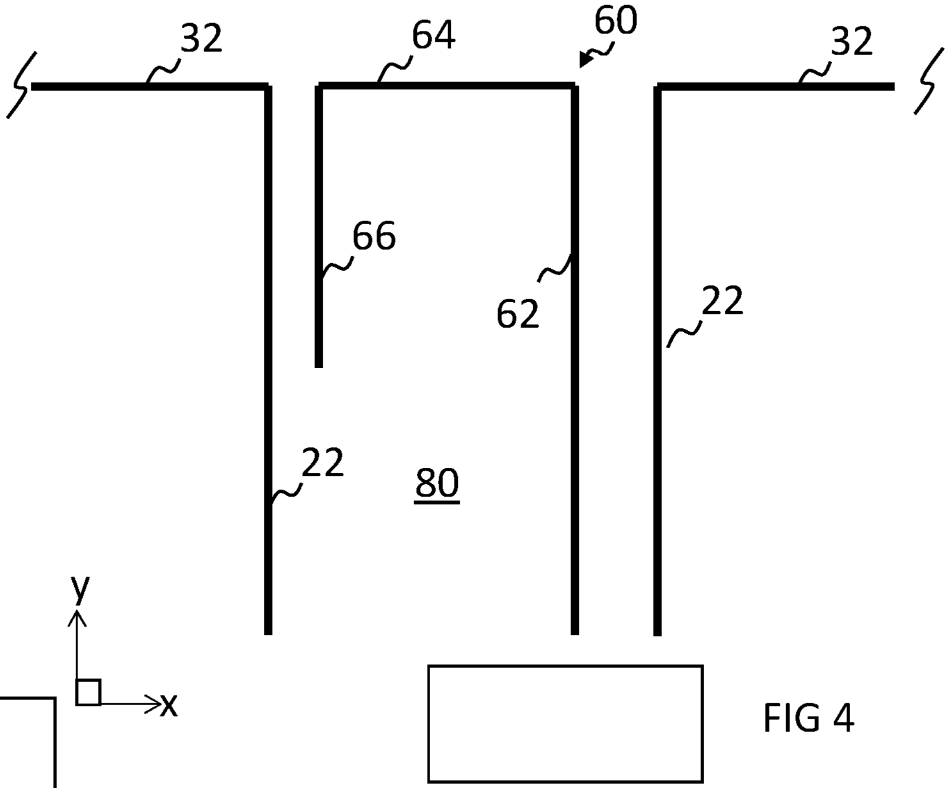
FIG. 4 shows an example of a feed for the antenna.

The example of the feed 80 in FIG. 3B is illustrated in more detail in FIG. 4.

A first part 62 of the feed 60 is separated from and adjacent one of the second conductive members 22, a second part 64 of the feed 60 extends across the void 80 between, but not to, the second conductive members 22. The void 80 is also a void between the third conductive members 32. Optionally, the feed 60 comprises a third part 66 separated from and adjacent the other one of the pair of second conductive members 22.

The first part 62 is straight and extends in the height direction (y-direction). The second part 64 is straight and extends in the physical length direction (x-direction). The second part 64 is shorter than the first part 62. The third part 66, if present, is straight and extends in the height direction (y-direction). The third part 66 is shorter than the first part 62.

In this example, the first part 62, the second part 64 and the third part 66 are galvanically interconnected. The feed 60 forms a capital gamma shape.

Referring back to FIG. 3B, in this example, the feed 60 is connected to a core 74 of a coaxial cable 70 and the ground plane 40 is connected to the shield (ground) 72 of the coaxial cable 70. However, the radio frequency (RF) coaxial cable 70 is just one way of making a connection. Other connections can be used, for example, a microstrip, a stripline, a coplanar waveguide and other types of RF transmission lines.

It can be appreciated from FIGS. 3A & 3B that, in this example, the feed 60 extends through an aperture 12 that extends through the ground plane 40, the dielectric 90 and the first conductive member 10. It could be such that the dielectric does not need an aperture 12 in some examples. For example, the first part 62 of the feed could be in contact with the dielectric 90 due to the manufacturing process, however in these and other examples the first conductive member 10 and the ground plane 40 do not make galvanic contact or interconnection with the first part 62. So, if the feed 60 is to extend through the first conductive member 10 and the ground plane 40 then there is an aperture 12 through at least the first conductive member 10 and the ground plane 40.

In this example the aperture 12 and the feed 60 are off-center with respect to the first conductive member 10. As can be seen from FIG. 3B the offset is in the x-direction. The first conductive member 10 does not have reflection symmetry in the virtual plane. As a consequence, the second conductive elements 22 are off-set from a center of the first conductive element 10.

In the preceding examples, the ground plane 40 is conductive. It can, in at least some examples, be planar (flat). It can operate as a reflector for radio frequency (RF) signals.

In the examples illustrated the ground plane 40 is located in a first plane. The first conductive member 10 is located in a second plane, different to the first plane, the second plane being arranged in a spaced relationship and parallel with the first plane. The first conductive member 10 in combination with the ground plane 40 forms a lower-frequency patch antenna.

FIG. 5 illustrates an example of a bandwidth of an antenna 50. The figure illustrates variation of return loss ($-20 \log_{10}|S11|$) with frequency.

The third conductive portions 32 form an electric dipole antenna with a higher frequency resonance. The second conductive portions 22 and an intermediate portion of the first conductor 10 together form a magnetic dipole antenna with a higher frequency resonance. The higher frequency resonance of the electric dipole antenna 30 and the higher frequency resonance of the magnetic dipole antenna 20 can be the same or can overlap.

The first conductive member 10 in combination with the ground plane 40 forms a lower-frequency resonance.

The bandwidth of the antenna 50 illustrated in FIG. 5 covers 2.4 GHz, the lower frequency resonance(s) or band, and 5.1 to 7.2 GHz, the higher frequency resonance(s) or band.

The first conductive member 10 is sized to resonate at the 2.4 GHz frequency band.

In the preceding description, a "planar" conductive element can be adapted so that a small part or all of a specific conductor could be made curved or adjusted in some way so that it is no longer absolutely flat and still be operational.

Vertical conductors like the second conductive members 22 can be off vertical or slightly off from vertical. They can, in some examples, still be symmetric in the virtual plane.

Horizontal conductors like the third conductive members 32 can be off horizontal or slightly off from horizontal. They can, in some examples, still be symmetric in the virtual plane.

It will be appreciated from the foregoing that the antenna 50 is a compact antenna that efficiently operates across multiple frequency bands. In particular a height of the antenna between the ground plane 40 and the third conductive members 32 is small for multi-band operation.

Where a structural feature has been described, it may be replaced by means for performing one or more of the functions of the structural feature whether that function or those functions are explicitly or implicitly described.

When the term band or bandwidth is used for the antenna 50 it refers to an 'operational bandwidth'.

An operational resonant mode (operational bandwidth) is a frequency range over which an antenna can efficiently operate. An operational resonant mode (operational bandwidth) may be defined as where the return loss of the antenna 50 is greater than (more negative then) an operational threshold T and where the radiated efficiency (er) is greater than an operational threshold in an efficiency plot.

The antenna 50 can be configured to operate in a plurality of operational resonant frequency bands. For example, the operational frequency bands may include (but are not limited to) Long Term Evolution (LTE) (US) (734 to 746 MHz and 869 to 894 MHz), Long Term Evolution (LTE) (rest of the world) (791 to 821 MHz and 925 to 960 MHz), amplitude modulation (AM) radio (0.535-1.705 MHz); frequency modulation (FM) radio (76-108 MHz); Bluetooth (2400-2483.5 MHz); wireless local area network (WLAN) (2400-

2483.5 MHz); hiper local area network (HiperLAN) (5150-5850 MHz); global positioning system (GPS) (1570.42-1580.42 MHz); US-Global system for mobile communications (US-GSM) 850 (824-894 MHz) and 1900 (1850-1990 MHz); European global system for mobile communications (EGSM) 900 (880-960 MHz) and 1800 (1710-1880 MHz); European wideband code division multiple access (EU-WCDMA) 900 (880-960 MHz); personal communications network (PCN/DCS) 1800 (1710-1880 MHz); US wideband code division multiple access (US-WCDMA) 1700 (transmit: 1710 to 1755 MHz, receive: 2110 to 2155 MHz) and 1900 (1850-1990 MHz); wideband code division multiple access (WCDMA) 2100 (transmit: 1920-1980 MHz, receive: 2110-2180 MHz); personal communications service (PCS) 1900 (1850-1990 MHz); time division synchronous code division multiple access (TD-SCDMA) (1900 MHz to 1920 MHz, 2010 MHz to 2025 MHz), ultra wideband (UWB) Lower (3100-4900 MHz); UWB Upper (6000-10600 MHz); digital video broadcasting-handheld (DVB-H) (470-702 MHz); DVB-H US (1670-1675 MHz); digital radio mondiale (DRM) (0.15-30 MHz); worldwide interoperability for microwave access (WiMax) (2300-2400 MHz, 2305-2360 MHz, 2496-2690 MHz, 3300-3400 MHz, 3400-3800 MHz, 5250-5875 MHz); digital audio broadcasting (DAB) (174.928-239.2 MHz, 1452.96-1490.62 MHz); radio frequency identification low frequency (RFID LF) (0.125-0.134 MHz); radio frequency identification high frequency (RFID HF) (13.56-13.56 MHz); radio frequency identification ultra high frequency (RFID UHF) (433 MHz, 865-956 MHz, 2450 MHz), frequency allocations for 5G may include e.g. 700 MHz, 410 MHz-7125 MHz (FR1), 24250 MHz-52600 MHz (FR2), 3.6-3.8 GHz, 24.25-27.5 GHz, 31.8-33.4 GHz, 37.45-43.5, 66-71 GHz, mmWave, and >24 GHz).

The antenna 50 may be configured to operate in a plurality of operational resonant frequency bands. For example, the operational frequency bands may include (but are not limited to)

| | FDD | TDD | |
|---|---|---|---|
| A | 555-806 | A | 2010-2025 |
| B | 694-960 | B | 1930-1990 |
| C | 806-894 | C | 1910-1930 |
| D | 694-862 | D | 2570-2620 |
| E | 790-960 | E | 2300-2400 |
| F | 694-894 | F | 1880-1920 |
| G | 870-960 | G | 2545-2650 |
| H | 694-906 | H | 2500-2690 |
| I | 824-960 | L | 1880-2025 |
| J | 1400-2200 | M | 1880-2690 |
| K | 824-894 | Y | 3300-3800 |
| L | 1695-2690 | U | 3400-3600 |
| M | 2300-2690 | Z | 3400-4200 |
| N | 790-862 | | |
| P | 1850-1995 | | |
| Q | 1710-1880 | | |
| R | 1695-2200 | | |
| S | 806-870 | | |
| U | 1920-2170 | | |
| W | 1695-2400 | | |
| Y | 1400-1520 | | |
| Z | 2300-2400 | | |

The radio frequency circuitry and the antenna may be configured to operate in a plurality of operational resonant frequency bands. For example, the operational frequency bands may include (but are not limited to) the bands specified in the current release of 3GPP TS 36.101.

As used here 'module' refers to a unit or apparatus that excludes certain parts/components that would be added by an end manufacturer or a user. The antenna 50 can be a module. The antenna 50 in combination with the feed 60 can be a module.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

Figure 6:
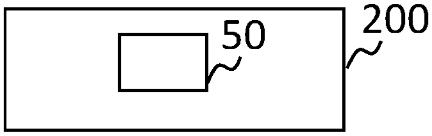
FIG. 6 shows an example of an apparatus comprising the antenna.

As illustrated in FIG. 6, an above-described example antenna 50 may be deployed in an apparatus 200, such as an electronic device including a controller, circuitry, radio frequency (RF) circuitry, an antenna as described above and a ground member for the antenna and RF circuitry. The electronic device 200 may be any apparatus such as a portable electronic device (for example, a mobile cellular telephone, a smartphone, a tablet computer, a laptop computer, a personal digital assistant or a hand-held computer), a non-portable electronic device (for example, a personal computer or a base station), a portable multimedia device (for example, a music player, a video player, a game console and so on) or a module for such devices.

The electronic device 200 can comprise radio frequency circuitry configured to transmit and/or receive radio frequency signals via the antenna 50. The electronic device 200 can additionally comprise circuitry for converting signals between the analogue domain (for reception/transmission) and the digital domain (e.g. for digital processing).

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An antenna for operation across multiple frequency bands, the antenna comprising, in order, a ground plane;

a first conductive member separated from the ground plane;

a pair of second conductive members forming, with the first conductive member, a resonant structure sized to resonate at a higher frequency band of the multiple frequency bands; and a pair of third conductive members forming a resonant structure sized to resonate at the higher frequency band of the multiple frequency bands, wherein the first conductive member is sized to resonate at a lower frequency band of the multiple frequency bands.

2. An antenna as claimed in claim 1, wherein the ground plane is galvanically isolated from the first conductive member, the pair of second conductive members and the pair of third conductive members.

3. An antenna as claimed in claim 1, wherein the first conductive member has a maximum electrical length that is a half of a resonant wavelength of the lower frequency band of the multiple frequency bands.

4. An antenna as claimed in claim 1, wherein the pair of second conductive members form, with the first conductive member, a magnetic dipole.

5. An antenna as claimed in claim 1, wherein the pair of third conductive members form a half wavelength electric dipole.

6. An antenna as claimed in claim 1, wherein each of the second conductive members, extends from a first end adjacent the first conductive member to a second end adjacent a respective third conductive member, with an electrical length of a quarter of a resonant wavelength of the higher frequency band of the multiple frequency bands at which the resonant structure formed by the pair of second conductive members is sized to resonate.

7. An antenna as claimed in claim 1, wherein the pair of second conductive members are parallel with a void between them.

8. An antenna as claimed in claim 1, wherein each of the third conductive members, extends from a first end adjacent a respective second conductive member to a distal end, wherein an electrical length between the respective distal ends of the third conductive members is a half of a resonant wavelength of the higher frequency band of the multiple frequency bands at which the resonant structure formed by the pair of third conductive members is sized to resonate.

9. An antenna as claimed in claim 1, wherein the pair of third conductive members lie in a common plane, and extend in opposite directions.

10. An antenna as claimed in claim 1, wherein the pair of third conductive members are symmetrically arranged with respect to the second conductive members.

11. An antenna as claimed in claim 1, wherein one of the pair of second conductive members is galvanically interconnected at a proximal end to the first conductive element and at a distal end to a proximal end of one of the pair of third conductive members, and the other one of the pair of second conductive members is galvanically interconnected at a proximal end to the first conductive element and at a distal end to a proximal end of the other one of the pair of third conductive members.

12. An antenna as claimed in claim 1, wherein the first conductive member is planar and the pair of third conductive members are planar and parallel to the first conductive member and the first conductive member is planar and the pair of second conductive members are planar and perpendicular to the first conductive member.

13. An antenna as claimed in claim 1, comprising a feed common to the multiple frequency bands.

14. An antenna as claimed in claim 13, wherein the antenna feed is galvanically isolated from the first conductive member, the pair of second conductive members and the pair of third conductive members.

15. An electronic device comprising an antenna as claimed in claim 1.

16. An electronic device comprising:

an antenna for operation across multiple frequency bands, the antenna comprising:

a ground plane;

a first conductive member separated from the ground plane;

a pair of second conductive members forming, with the first conductive member, a resonant structure sized to resonate at a higher frequency band of the multiple frequency bands;

a pair of third conductive members forming a resonant structure sized to resonate at a higher frequency band of the multiple frequency bands, wherein the first conductive member is sized to resonate at a lower frequency band of the multiple frequency bands; and radio frequency circuitry configured to transmit or receive radio frequency signals via the antenna.

17. An electronic device as claimed in claim 16, further comprising circuitry for converting signals between an analog domain for transmission or reception and a digital domain for digital processing.

18. An electronic device as claimed in claim 16, wherein the electronic device comprises a mobile cellular telephone.

19. An electronic device as claimed in claim 16, wherein the electronic device comprises a smartphone.

20. An electronic device as claimed in claim 16, wherein the electronic device comprises a non-portable electronic device.

* * * * *